(12) United States Patent
Kim et al.

(10) Patent No.: US 9,723,194 B2
(45) Date of Patent: Aug. 1, 2017

(54) PHOTOGRAPHING APPARATUS PROVIDING IMAGE TRANSMISSION BASED ON COMMUNICATION STATUS, METHOD OF CONTROLLING THE SAME, AND NON-TRANSITORY COMPUTER-READABLE STORAGE MEDIUM FOR EXECUTING THE METHOD

(71) Applicant: SAMSUNG ELECTRONICS CO., LTD., Suwon-si, Gyeonggi-do (KR)

(72) Inventors: Hyon-soo Kim, Yongin-si (KR); Sang-ryoon Son, Yongin-si (KR); Seung-tae Oh, Incheon (KR); Ki-deok Lee, Suwon-si (KR); Sang-hyun Jo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 489 days.

(21) Appl. No.: 14/036,529

(22) Filed: Sep. 25, 2013

(65) Prior Publication Data

US 2014/0168452 A1 Jun. 19, 2014

(30) Foreign Application Priority Data

Dec. 18, 2012 (KR) .................. 10-2012-0148874

(51) Int. Cl.
  *H04N 5/232* (2006.01)
  *H04N 1/333* (2006.01)
  (Continued)

(52) U.S. Cl.
  CPC ..... *H04N 5/23206* (2013.01); *H04N 1/33353* (2013.01); *H04N 5/23245* (2013.01);
  (Continued)

(58) Field of Classification Search
  CPC ......... H04N 1/00127; H04N 21/64723; H04N 21/64738; H04N 1/00214; H04N 1/00095;
  (Continued)

(56) References Cited

U.S. PATENT DOCUMENTS 5,822,541 A * 10/1998 Nonomura ............... H04N 7/52
  375/240.15
5,968,132 A * 10/1999 Tokunaga ............... H04L 43/00
  375/E7.017

(Continued)

FOREIGN PATENT DOCUMENTS

EP 1 143 694 A2 10/2001
JP 11069339 A * 3/1999
(Continued)

OTHER PUBLICATIONS

Extended Search Report issued for EP 13186982.8 (Jan. 29, 2014).

*Primary Examiner* — John Villecco
(74) *Attorney, Agent, or Firm* — Drinker Biddle & Reath LLP (57) ABSTRACT

A photographing apparatus includes a photographing unit that captures an image from incident light thereon; a communication status checking unit that checks a communication status of the photographing apparatus; a resolution determination unit that sets a resolution for a first image file for the captured image according to the communication status; a file generation unit that generates the first image file from the captured image, the first image file having the set resolution; and a communication unit that transmits the first image file to an external device.

15 Claims, 6 Drawing Sheets

| COMMUNICATION TYPE | COMMUNICATION SPEED | RESOLUTION |
|---|---|---|
| WiFi | EQUAL TO OR HIGHER THAN A | k |
| | LOWER THAN A, AND EQUAL TO OR HIGHER THAN B | ℓ |
| | LOWER THAN B | m |
| 3G | EQUAL TO OR HIGHER THAN C | ℓ |
| | LOWER THAN C AND EQUAL TO OR HIGHER THAN D | m |
| | LOWER THAN D | n |

(51) Int. Cl.
  *H04N 1/00* (2006.01)
  *H04N 101/00* (2006.01)
(52) U.S. Cl.
  CPC ..... *H04N 1/00244* (2013.01); *H04N 2101/00* (2013.01); *H04N 2201/0036* (2013.01); *H04N 2201/0055* (2013.01); *H04N 2201/0084* (2013.01)
(58) Field of Classification Search
  CPC ........... H04N 5/23206; H04N 1/33353; H04N 5/23245; H04N 2201/0034
  USPC ...................... 348/211.1, 211.2, 211.3, 207.1
  See application file for complete search history.

(56) References Cited

U.S. PATENT DOCUMENTS

| | | | | |
|---|---|---|---|---|
| 7,095,982 B2* | 8/2006 | Mizutani | ............ | H04M 1/7253 348/14.02 |
| 7,256,821 B2* | 8/2007 | Hata | ................. | H04L 12/40117 348/207.1 |
| 7,362,352 B2* | 4/2008 | Ueyama | ................. | H04N 5/232 348/207.1 |
| 7,612,807 B2* | 11/2009 | Morino | .............. | H04N 1/00214 348/231.1 |
| 8,004,581 B2* | 8/2011 | Ishikawa | ............ | H04N 5/23216 348/231.2 |
| 2001/0034222 A1* | 10/2001 | Roustaei | ............ | H04N 1/00281 455/403 |
| 2002/0126751 A1* | 9/2002 | Scheurich | ............ | H04N 5/232 375/240.02 |
| 2002/0167690 A1* | 11/2002 | Fujii | ................. | H04N 1/33307 358/539 |
| 2003/0117505 A1* | 6/2003 | Sasaki | ................. | H04N 1/0044 348/231.99 |
| 2003/0161010 A1 | 8/2003 | Schinner | | |
| 2005/0030369 A1* | 2/2005 | Ryu | ....................... | H04N 7/147 348/14.01 |
| 2005/0055727 A1* | 3/2005 | Creamer | ............ | H04N 1/00214 725/105 |
| 2006/0092266 A1* | 5/2006 | Morgan | ............. | H04N 1/32117 348/14.01 |
| 2006/0128407 A1* | 6/2006 | Kim | ................... | H04M 1/72555 455/466 |
| 2006/0226232 A1* | 10/2006 | Helkio | .............. | H04M 1/72522 235/472.01 |
| 2007/0216782 A1* | 9/2007 | Chernoff | ................ | H04N 5/772 348/231.99 |
| 2010/0064002 A1* | 3/2010 | Levanon | ................... | G06F 3/14 709/203 |
| 2011/0289136 A1* | 11/2011 | Klassen | ............. | H04N 1/32101 709/203 |
| 2012/0077483 A1* | 3/2012 | Abraham | ............... | H04W 4/003 455/422.1 |
| 2012/0307078 A1* | 12/2012 | Canan | ................... | H04L 65/605 348/207.1 |
| 2013/0084904 A1* | 4/2013 | Park | ...................... | H04W 28/22 455/500 |
| 2013/0335584 A1* | 12/2013 | Kato | ........................ | G06F 3/005 348/207.1 |
| 2014/0112193 A1* | 4/2014 | Lee | ....................... | H04W 48/18 370/254 |
| 2014/0372945 A1* | 12/2014 | Fan | ..................... | G06F 3/04845 715/810 |

FOREIGN PATENT DOCUMENTS

| | | | |
|---|---|---|---|
| JP | 2001022675 A | * | 1/2001 |
| JP | 2003259343 A | * | 9/2003 |
| JP | 2005020731 A | * | 1/2005 |
| JP | 2005064785 A | * | 3/2005 |

* cited by examiner

| COMMUNICATION TYPE | COMMUNICATION SPEED | RESOLUTION |
|---|---|---|
| WiFi | EQUAL TO OR HIGHER THAN A | k |
| WiFi | LOWER THAN A, AND EQUAL TO OR HIGHER THAN B | $\ell$ |
| WiFi | LOWER THAN B | m |
| 3G | EQUAL TO OR HIGHER THAN C | $\ell$ |
| 3G | LOWER THAN C AND EQUAL TO OR HIGHER THAN D | m |
| 3G | LOWER THAN D | n |

PHOTOGRAPHING APPARATUS PROVIDING IMAGE TRANSMISSION BASED ON COMMUNICATION STATUS, METHOD OF CONTROLLING THE SAME, AND NON-TRANSITORY COMPUTER-READABLE STORAGE MEDIUM FOR EXECUTING THE METHOD

CROSS-REFERENCE TO RELATED PATENT APPLICATION

This application claims the priority benefit under 35 U.S.C. §119(a) from Korean Patent Application No. 10-2012-0148874, filed on Dec. 18, 2012, in the Korean Intellectual Property Office, the disclosure of which is incorporated herein by reference in its entirety.

BACKGROUND

1. Field

Various embodiments of the invention relate to a photographing apparatus, a method of controlling the same, and a non-transitory computer-readable storage medium having recorded thereon computer program codes to perform the method of controlling the photographing apparatus on a computer.

2. Related Art

Recently, as more functions are embedded in photographing apparatuses, photographing apparatuses having a communication function have been widely used. By using the communication function, a user of a photographing apparatus may receive useful information, such as weather information, location information, and the like, and also transmit a captured image directly to an external device. However, since most communication functions in photographing apparatuses are performed via a wireless communication network, a communication status may vary according to the time and place where the user is located.

SUMMARY

Various embodiments provide easier image transmission, even when a communication status of a photographing apparatus is low.

Various embodiments also provide adjustment of a data amount according to a communication status of a photographing apparatus.

According to an embodiment, a photographing apparatus includes a photographing unit that captures an image from incident light thereon; a communication status checking unit that checks a communication status of the photographing apparatus; a resolution determination unit that sets a resolution for a first image file for the captured image according to the communication status; a file generation unit that generates the first image file from the captured image, the first image file having the set resolution; and a communication unit that transmits the first image file to an external device.

The communication status may include at least one of a communication type and a communication speed.

The resolution determination unit may set the resolution higher for a first communication speed than for a second communication speed, wherein the first communication speed is higher than the second communication speed.

A maximum resolution for the first image file, set by the resolution determination unit, may vary with the communication type.

The photographing apparatus may further include a mode setting unit that sets an operation mode of the photographing apparatus to a picture upload mode for generation of the first image file to be transmitted to the external device.

The file generation unit may generate a second image file from the captured image and store the second image file, the second image file having a pre-set resolution.

According to another embodiment, a method of controlling a photographing apparatus includes capturing an image; checking a communication status of the photographing apparatus; setting a resolution for a first image file for the captured image according to the communication status; generating the first image file from the captured image, the first image file having the set resolution; and transmitting the first image file to an external device.

The communication status may include at least one of a communication type and a communication speed.

The setting of the resolution may include setting the resolution higher for a first communication speed than for a second communication speed, wherein the first communication speed is higher than the second communication speed.

A maximum resolution for the first image file may vary with the communication type.

The method of controlling a photographing apparatus may further include, before the capturing of the image, setting an operation mode of the photographing apparatus to a picture upload mode for generation of the first image file to be transmitted to the external device.

The method of controlling a photographing apparatus may further include generating a second image file from the captured image and storing the second image file, wherein the second image may have a pre-set resolution.

According to another embodiment, a non-transitory computer-readable recording medium has recorded thereon computer program codes to perform a method of controlling a photographing apparatus via a processor. The method of controlling the photographing apparatus may include capturing an image; checking a communication status of the photographing apparatus; setting a resolution for a first image file for the captured image according to the communication status; generating the first image file from the captured image, the first image file having the set resolution; and transmitting the first image file to an external device.

The communication status may include at least one of a communication type and a communication speed.

The setting of the resolution may include setting the resolution higher for a first communication speed than for a second communication speed, wherein the first communication speed is higher than the second communication speed.

A maximum resolution for the first image file may vary with the communication type.

The method of controlling a photographing apparatus may further include, before the capturing of the image, setting an operation mode of the photographing apparatus to a picture upload mode for generation of the first image file to be transmitted to the external device.

The method of controlling a photographing apparatus may further include generating a second image file from the captured image and storing the second image file, wherein the second image may have a pre-set resolution.

BRIEF DESCRIPTION OF THE DRAWINGS

The above and other features and advantages of the invention will become more apparent by describing in detail exemplary embodiments thereof with reference to the attached drawings in which.

DETAILED DESCRIPTION

The following description and accompanying drawings are provided for better understanding of the embodiments of the invention. In the following description, well-known functions or constructions are not described in detail if it is determined that they would obscure the embodiments due to unnecessary details.

The following description and drawings are not intended to restrict the scope of the invention, and the scope of the invention should be defined by the appended claims. The terms used in the following description are merely used to describe particular embodiments of the invention and are not intended to limit the invention.

Hereinafter, exemplary embodiments of the invention will be described in detail with reference to the accompanying drawings.

Figure 1:
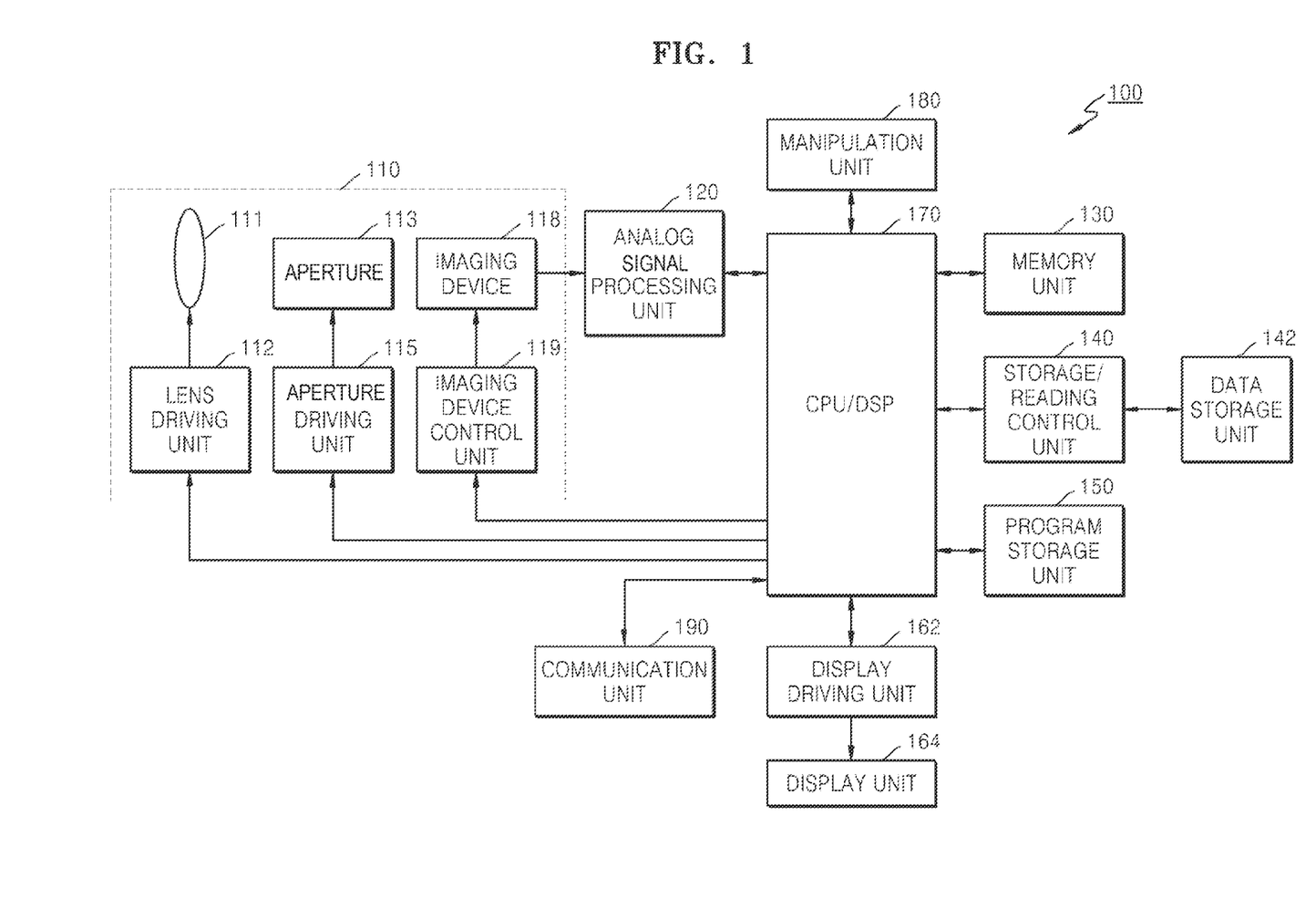
FIG. 1 is a block diagram illustrating a structure of a photographing apparatus, according to an embodiment.

FIG. 1 is a block diagram illustrating a structure of a photographing apparatus 100, according to an embodiment.

The photographing apparatus 100, according to an embodiment, may include a photographing unit 110, an analog signal processing unit 120, a memory unit 130, a storage/reading control unit 140, a data storage unit 142, a program storage unit 150, a display driving unit 162, a display unit 164, a central processing unit (CPU)/digital signal processor (DSP) 170, a manipulation unit 180, and a communication unit 190.

The CPU/DSP 170 controls overall operations of the photographing apparatus 100. The CPU/DSP 170 supplies respective control signals to a lens driving unit 112, an aperture driving unit 115, and an imaging device control unit 119 so as to operate such units.

The photographing unit 110 is a device for generating a captured image in response to an electrical signal due to incident light. The photographing unit 110 includes a lens 111, the lens driving unit 112, an aperture 113, the aperture driving unit 115, an imaging device 118, and the imaging device control unit 119.

The lens 111 may include a plurality of lenses or groups of lenses. A location of the lens 111 is adjusted by the lens driving unit 112. The lens driving unit 112 adjusts the location of the lens 111 according to a control signal received from the CPU/DSP 170.

An opening degree of the aperture 113 is adjusted by the aperture driving unit 115 so that an intensity of the light incident on the imaging device 118 can be adjusted.

An optical signal passing through the lens 111 and the aperture 113 reaches a light-receiving surface of the imaging device 118 and forms an image of a subject on the light-receiving surface of the imaging device 118. The imaging device 118 may be a charge-coupled device (CCD) image sensor or a complementary metal-oxide semiconductor (CMOS) image sensor that converts the optical signal into an analog electrical signal. A sensitivity of the imaging device 118 may be adjusted by the imaging device control unit 119. The imaging device control unit 119 may control the imaging device 118 according to either a control signal which is automatically generated according to an image signal input in real-time or a control signal which is manually input by a user.

An exposure time of the imaging device 118 is adjusted by a shutter (not illustrated). The shutter may be a mechanical shutter adjusting incident light by moving a blind or an electronic shutter adjusting exposure to the light by applying an electrical signal to the imaging device 118.

The analog signal processing unit 120 performs operations such as noise reduction processing, gain control, waveform shaping, and analog-to-digital conversion processing on the analog electrical signal supplied from the imaging device 118.

A signal processed by the analog signal processing unit 120 may be input to the CPU/DSP 170 via the memory unit 130 or directly without passing through the memory unit 130. The memory unit 130 operates as a main memory unit of the photographing apparatus 100 and temporarily stores information during operation of the CPU/DSP 170. The program storage unit 150 stores programs such as an operating system for operating the photographing apparatus 100, an application system, and the like.

The photographing apparatus 100 further includes the display unit 164 for displaying an operation state of the photographing apparatus 100 or information regarding an image captured by the photographing apparatus 100. The display unit 164 may provide a user with visual and/or audio information. The display unit 164, for providing visual information, may include, for example, a liquid crystal display (LCD) panel, an organic light-emitting diode (OLED) display panel, or the like. Furthermore, the display unit 164 may be a touch screen which may recognize a touch input.

The display driving unit 162 supplies a driving signal to the display unit 164.

The CPU/DSP 170 processes a received image signal for an image and controls each unit of the photographing apparatus 100 according to the image signal or an external input signal. The CPU/DSP 170 may reduce noise and perform image signal processing such as gamma correction, color filter array interpolation, color matrix, color correction, and color enhancement for the input image data, to improve image quality. In addition, the CPU/DSP 170 may generate an image file by compressing image data which is obtained from image signal processing for image improvement, or may restore image data from the image file. Image compression may be reversible or irreversible. For example, a still image may be transformed into a Joint Photographic Experts Group (JPEG) format or a JPEG 2000 format. In a case of recording a moving picture, a moving picture file may be generated by compressing a plurality of frames according to Moving Picture Experts Group (MPEG) standards. An image file may be generated, for example, according to exchangeable image file format (Exif) standards.

Image data or an image file which is output from the CPU/DSP 170 is input to the storage/reading control unit 140 directly or through the memory unit 130. The storage/reading control unit 140 stores image data or image files in the data storage unit 142 automatically or according to a signal from a user. The storage/reading control unit 140 may also read image data from an image file stored in the data storage unit 142 and may input the image data to the display driving unit 162 via the memory unit 130 or another path so that the image may be displayed on the display unit 164. The data storage unit 142 may be detachably attached to or permanently mounted in the photographing apparatus 100.

Additionally, the CPU/DSP 170 may perform color processing, blurring processing, edge emphasis processing, image interpretation processing, image recognition processing, image effect processing, or the like. The image recognition processing may include face recognition processing and scene recognition processing. Also, the CPU/DSP 170 may perform processing of a display image signal to be displayed on the display unit 164. For example, the CPD/DSP 170 may perform brightness level adjustment, color correction, contrast control, edge enhancement adjustment, screen division processing, character image generation, and image synthesizing processing. The CPU/DSP 170 may be connected to an external monitor and perform processing of a predetermined image signal to be displayed on the external monitor, and may transmit the processed image data to the external monitor so that the corresponding image is displayed on the external monitor.

The CPU/DSP 170 may execute a program stored in the program storage unit 150 or include an additional module to generate a control signal for controlling auto-focusing, zooming, focusing, and automatic exposure (AE) compensation, thereby supplying respective control signals to the aperture driving unit 115, the lens driving unit 112, and the imaging device control unit 119. Thus, the CPU/DSP 170 may control various operations of units of the photographing apparatus 100 such as a shutter and a strobe light.

The manipulation unit 180 is a unit via which a user may input a control signal. The manipulation unit 180 may include various function buttons such as a shutter-release button for inputting a shutter-release signal to expose the imaging device 118 to light for a predetermined time for photographing, a power button for inputting a control signal to control a power ON or OFF, a zoom button for widening or narrowing a viewing angle according to an input, a mode selection button, and other buttons for adjusting photographing settings. The manipulation unit 180 may be implemented in any form such as a button, a keyboard, a touchpad, a touch screen, a remote control unit, and the like via which a user may input a control signal.

Figure 2:
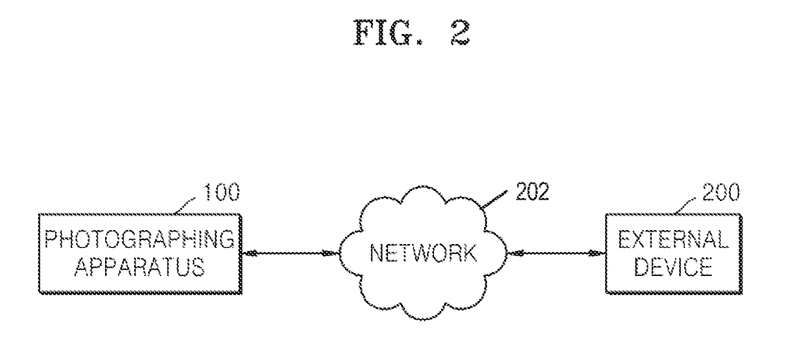
FIG. 2 is a block diagram illustrating the photographing apparatus and an external device, according to an embodiment.

The communication unit 190 transmits and receives data to/from an external device 200 (FIG. 2). The communication unit 190 may be implemented by using various communication standards. For example, the communication unit 190 may be implemented by using a communication standard such as WiFi, third-generation (3G), long-term evolution (LTE), Bluetooth, or infrared (IR) light communication. The communication unit 190 may receive a control signal or data from the external device 200, or transmit an image file stored in the photographing apparatus 100 to the external device 200.

FIG. 2 is a diagram illustrating the photographing apparatus 100 and an external device 200, according to an embodiment.

According to an embodiment, the photographing apparatus 100 is connected to an external device 200 via a network 202. The external device 200 may be, for example, a social networking service (SNS) server, an Internet service server, a communication terminal, a personal computer, or a tablet PC. A user may transmit an image captured by the photographing apparatus 100 or an image file stored in the photographing apparatus 100 to the external device 200. If the external device 200 is a server such as an SNS server, the user may upload an image file to the server. If the external device 200 is a communication terminal, a PC, or a table PC, the user may transmit the image file to the communication terminal.

Figure 3:
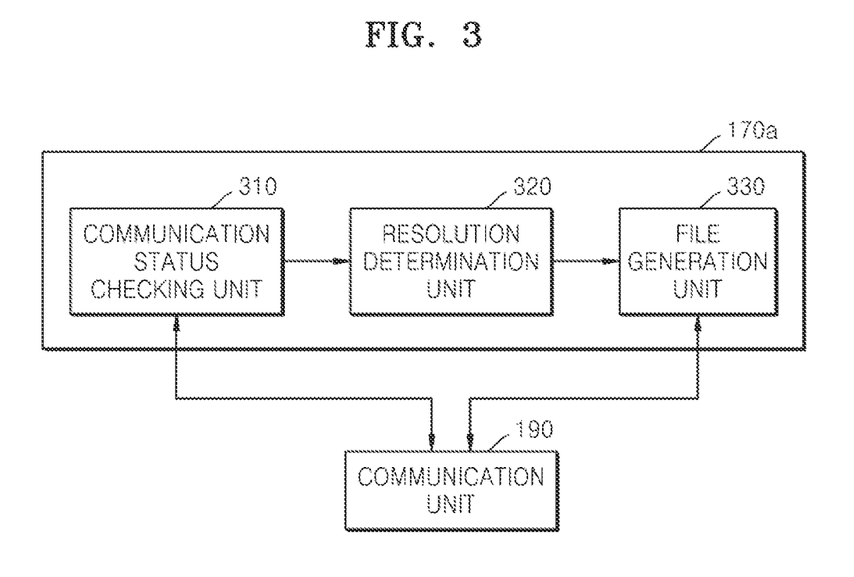
FIG. 3 is a block diagram illustrating a central processing unit (CPU)/digital signal processor (DSP) and a communication unit, according to an embodiment.

FIG. 3 is a diagram illustrating a CPU/DSP 170a and the communication unit 190, according to an embodiment.

According to an embodiment, the CPU/DSP 170a includes a communication status checking unit 310, a resolution determination unit 320, and a file generation unit 330.

The communication status checking unit 310 checks a communication status of the communication unit 190. The communication status may include at least one of a communication type and a communication speed. For example, the communication type may be WiFi, 3G, or LTE communication.

The resolution determination unit 320 sets a resolution of an image file to be generated from a captured image, according to the communication status. If the communication speed is high, the resolution determination unit 320 may set the resolution of the image file to be high. On the contrary, if the communication speed is low, the resolution determination unit 320 may set the resolution of the image file to be low. Additionally, the resolution determination unit 320 may set a maximum resolution of the image file according to the communication type. According to an embodiment, the resolution determination unit 320 may set a resolution of the image file by considering only a communication speed. According to another embodiment, the resolution determination unit 320 may set a resolution of the image file by considering both the communication speed and the communication type.

Figure 4:
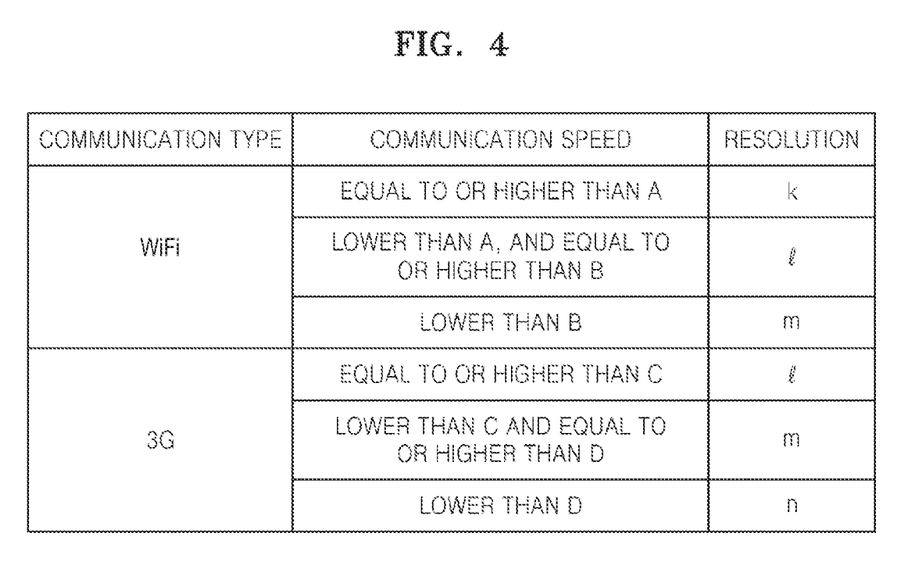
FIG. 4 illustrates an example table for setting a resolution in a resolution determination unit.

FIG. 4 illustrates an example of setting a resolution in the resolution determination unit 320.

As illustrated in FIG. 4, the resolution determination unit 320 may set a resolution by considering both the communication type and the communication speed. In such case, a maximum resolution may be set according to the communication type. For example, in a case of WiFi communication, a maximum resolution 'k' may be set to be higher than '/', which is a maximum resolution when 3G communication is used. In many cases, the WiFi communication service is provided free of charge, where the 3G communication service is not free of charge. Thus, in the case of using a paid communication network service, the resolution determination unit 320 may prevent an excessive charge for the 3G communication service. For example, a smaller resolution may allow for a smaller size of the image file, which reduces a data amount to be transferred. Accordingly, the resolution determination unit 320 may adjust the data amount by adjusting the resolution.

The file generation unit 330, shown in FIG. 3, generates a first image file by using an image signal supplied from the photographing unit 110, according to a resolution set by the resolution determination unit 320. For example, if the communication status checking unit 310 checks a communication speed and determines that the communication speed is low, and thus, the resolution determination unit 320 sets a low resolution, the file generation unit 330 may generate the first image file with a low resolution. On the contrary, if the communication status checking unit 310 checks a communication speed and determines that the communication speed is high, and thus, the resolution determination unit 320 sets a high resolution, the file generation unit 330 may generate the first image file with a high resolution.

The file generation unit 330 may convert an image signal into, for example, the JPEG format or a graphic interchange format (GIF). Additionally, in case of a moving picture file, the file generation unit 330 may generate a moving picture file by compressing a plurality of frames, for example, according to the MPEG standards. An image file may be generated, for example, according to exchangeable image file format (Exif) standards.

The file generation unit 330 may store the generated first image file in the data storage unit 142.

The communication unit 190 transmits the generated first image file to the external device 200. If the external device 200 is an Internet service-related server such as an SNS server, the communication unit 190 may be connected to the corresponding server by using information regarding connection to the corresponding server (e.g., login information), and upload the first image file to the corresponding server. If the external device 200 is a communication terminal, the communication unit 190 may be connected to the corresponding communication terminal by using information regarding connection to the corresponding communication terminal, and upload the first image file to the corresponding communication terminal.

Figure 5:
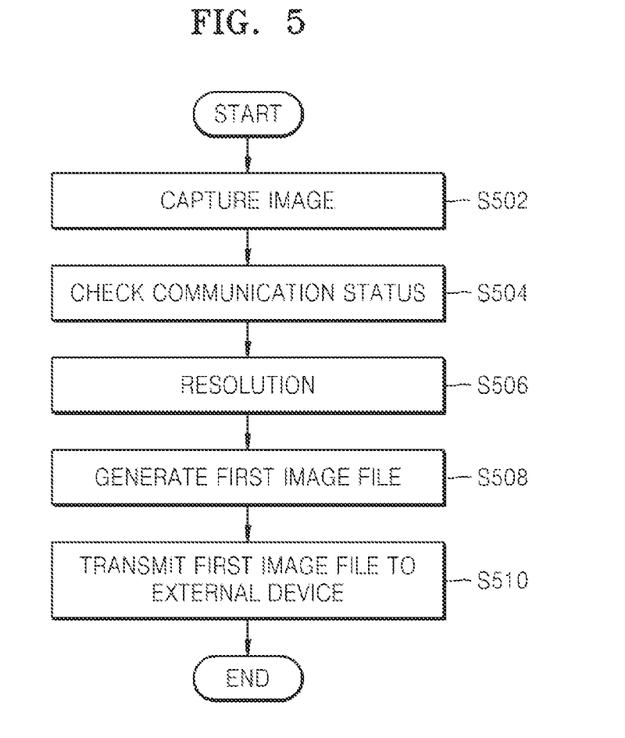
FIG. 5 is a flowchart illustrating a method of controlling the photographing apparatus according to an embodiment.

FIG. 5 is a flowchart illustrating a method of controlling the photographing apparatus 100 according to an embodiment.

According to an embodiment, in operation S502, an image is captured by using the imaging device 118. The image may be a still image or a moving picture.

Then, in operation S504, a communication status of the photographing apparatus 100 is checked. The communication status may include one of a communication type and a communication speed.

When the communication status is checked, in operation S506, a resolution of an image file to be generated is set according to the communication status. If a communication speed is high, the resolution may be set high. If a communication speed is low, the resolution may be set low. Additionally, a maximum resolution may be set according to the communication type.

Then, in operation S508, according to the set resolution, a captured image is converted to a first image file. For example, if it is checked and determined that the communication speed is high, and thus, the resolution is set high, a first image file is generated with a high resolution. On the contrary, if it is checked and determined that the communication speed is low, and thus, the resolution is set low, the first image file is generated with a low resolution.

Then, in operation S510, the generated first image file is transmitted to the external device 200.

Figure 6:
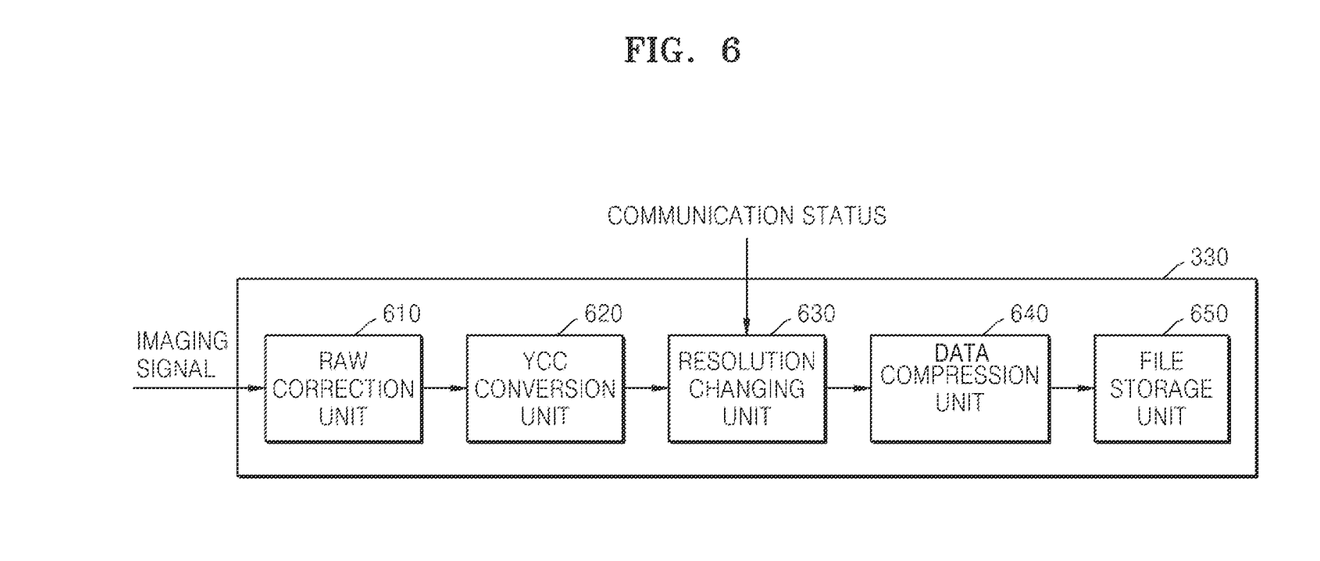
FIG. 6 is a block diagram illustrating a structure of a file generation unit, according to an embodiment.

FIG. 6 is a diagram illustrating a structure of the file generation unit 330, according to an embodiment.

The file generation unit 330, according to an embodiment, may include a raw correction unit 610, a YCbCr (YCC) conversion unit 620, a resolution changing unit 630, a data compression unit 640, and a file storage unit 650. The raw correction unit 610 corrects raw data of an imaging signal input from the photographing unit 110 by performing noise reduction processing on the raw data. Then, the YCC conversion unit 620 converts the raw data of the imaging signal into a YCC color coordinate image. The resolution changing unit 630 changes a resolution of the YCC color coordinate image, according to a resolution set by the resolution determination unit 320. When the resolution is changed, color interpolation and edge compensation may also be performed. The data compression unit 640 compresses the YCC color coordinate image, after the resolution has been changed, into an image file in a JPEG format or a MPEG format, and thus, generates a first image file. The file storage unit 650 stores the first image file in the memory unit 130 and/or the data storage unit 142.

Figure 7:
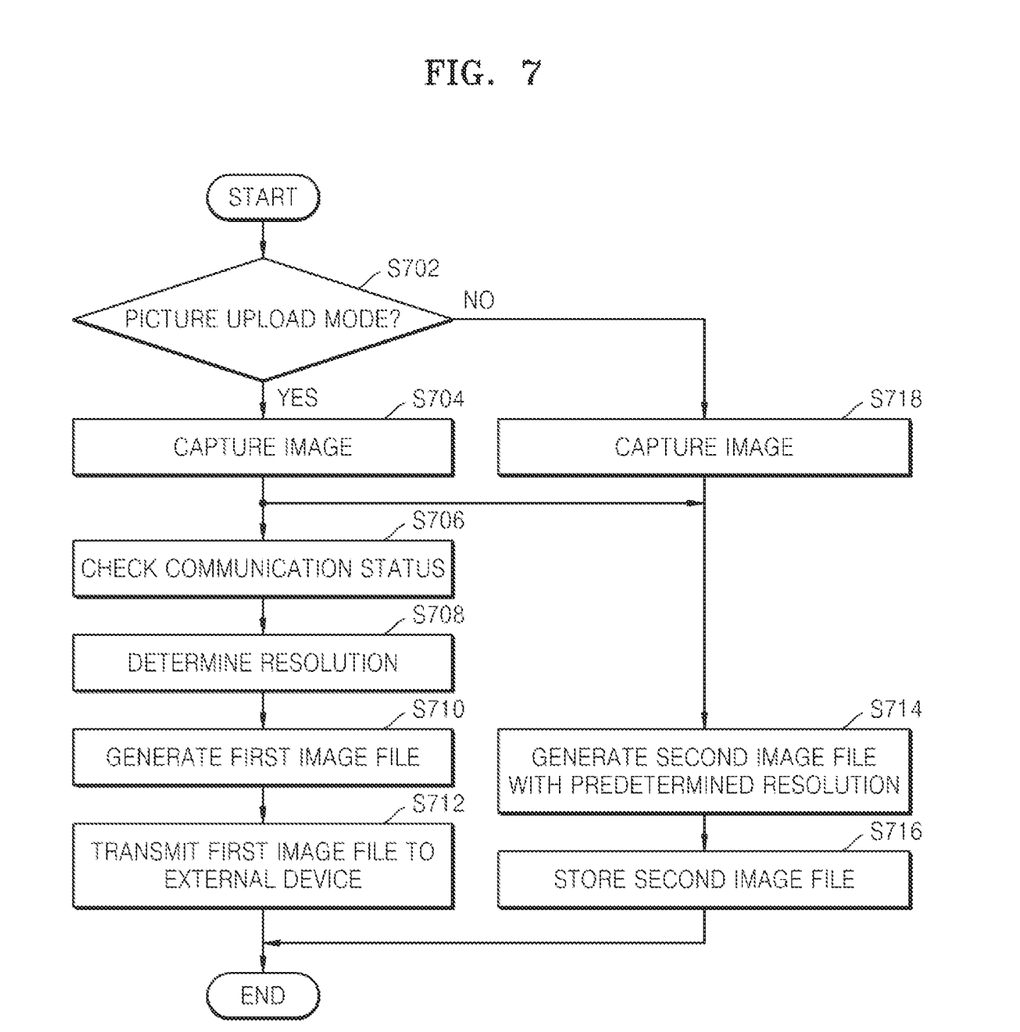
FIG. 7 is a flowchart illustrating a method of controlling a photographing apparatus, according to another embodiment.

FIG. 7 is a flowchart illustrating a method of controlling a photographing apparatus (e.g., the photographing apparatus 100), according to another embodiment.

In the present embodiment, a file generation process varies according to whether a picture upload mode for capturing an image and transmitting the captured image to the external device 200 is set.

In operation S702, it is determined whether the photographing apparatus 100 is set to the picture upload mode. If the photographing apparatus 100 is set to the picture upload mode in operation S702, an image is captured in operation S704, and a communication status is checked in S706. When the communication status is checked, a resolution is set according to a communication status in operation S708, and a first image file is generated to have the set resolution in operation S710. When the first image file is generated, the first image file is transmitted to the external device 200 in operation S712.

If the photographing apparatus 100 is not set to the picture upload mode in operation S702, an image is captured in operation S718, and the captured image is converted to have a predetermined resolution, so as to generate a second image file in operation S714, and the second image file is stored in operation S716. That is, if the photographing apparatus 100 is not set to the picture upload mode, the second image file is generated to have the predetermined resolution, regardless of the communication status. The predetermined resolution is pre-set by a user or the photographing apparatus 100.

The resolution of the first image file may be the same or different from the resolution of the second image file.

According to another embodiment, if the photographing apparatus 100 is in the picture upload mode, it is possible to generate only a first image file of which resolution is determined according to a communication status.

As another example, if the photographing apparatus 100 is in the picture upload mode, it is also possible to generate a first image file and a second image file with a predetermined resolution. When the first and second image files are generated together, the first image file may be transmitted to the external device 200, and only the second image file may be stored in the data storage unit 142.

Figure 8:
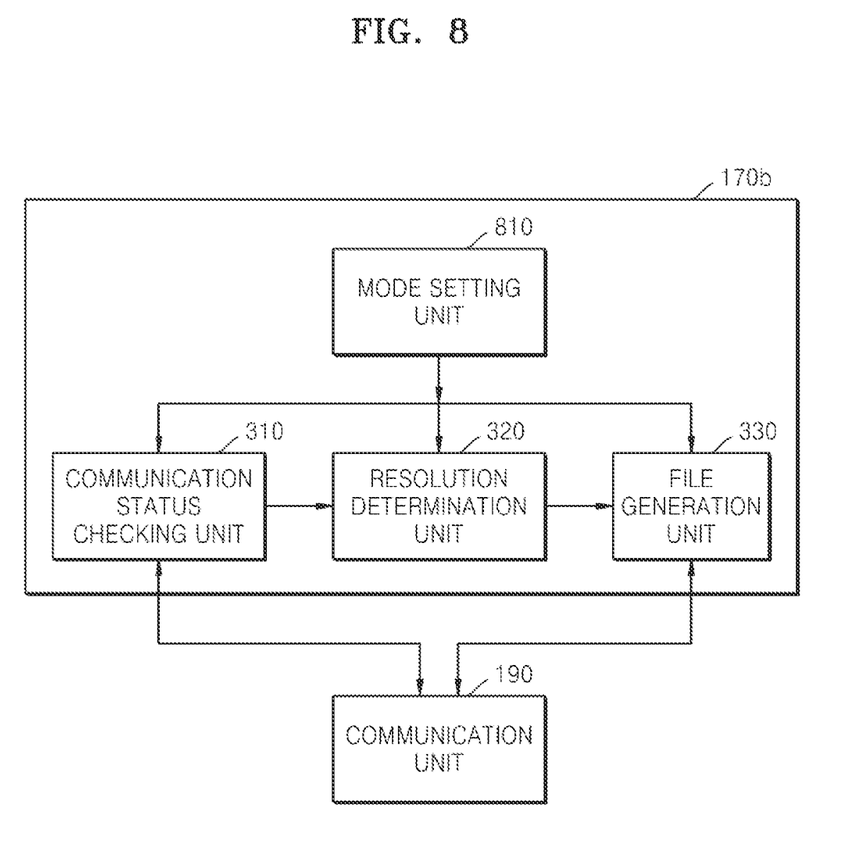
FIG. 8 is a block diagram illustrating a CPU/DSP and a communication unit, according to another embodiment.

FIG. 8 is a diagram illustrating a CPU/DSP 170b and the communication unit 190, according to another embodiment.

According to another embodiment, the CPU/DSP 170b may include a mode setting unit 810, the communication status checking unit 310, the resolution determination unit 320, and the file generation unit 330.

The mode setting unit 810 sets an operation mode of the photographing apparatus 100. The photographing apparatus 100 may be set to one of various operation modes, such as a general mode, a picture upload mode, a night mode, a sports mode, a portrait mode, a moving picture photographing mode, a macro mode, a landscape mode.

The communication status checking unit 310 checks a communication status of the communication unit 190. Various embodiments may be implemented so that the communication status checking unit 310 may always check a communication status or may check a communication status only in a picture upload mode.

When the operation mode of the photographing apparatus 100 is set to a picture upload mode, the resolution determination unit 320 sets a resolution of an image file for a captured image according to a communication status.

If the photographing apparatus 100 is in the picture upload mode, the file generation unit 330 generates a first image file with a resolution, set by the resolution determination unit 320, from an imaging signal provided by the photographing unit 110. If the operation mode of the photographing apparatus 100 is not the picture upload mode, the file generation unit 330 generates a second image file with a predetermined resolution from an imaging signal provided by the photographing unit 110.

If the photographing apparatus 100 is in the picture upload mode, the communication unit 190 transmits a first image file generated by the file generation unit 330 to the external device 200.

According to various embodiments, image transmission may be facilitated even when a communication status of a photographing apparatus is low.

According to various embodiments, data amount may be adjusted according to a communication status of a photographing apparatus.

All references, including publications, patent applications, and patents, cited herein are hereby incorporated by reference to the same extent as if each reference were individually and specifically indicated to be incorporated by reference and were set forth in its entirety herein.

For the purposes of promoting an understanding of the principles of the invention, reference has been made to the embodiments illustrated in the drawings, and specific language has been used to describe these embodiments. However, no limitation of the scope of the invention is intended by this specific language, and the invention should be construed to encompass all embodiments that would normally occur to one of ordinary skill in the art. The terminology used herein is for the purpose of describing the particular embodiments and is not intended to be limiting of exemplary embodiments of the invention. In the description of the embodiments, certain detailed explanations of related art are omitted when it is deemed that they may unnecessarily obscure the essence of the invention.

The apparatus described herein may comprise a processor, a memory for storing program data to be executed by the processor, a permanent storage such as a disk drive, a communications port for handling communications with external devices, and user interface devices, including a display, touch panel, keys, buttons, etc. When software modules are involved, these software modules may be stored as program instructions or computer readable code executable by the processor on a non-transitory computer-readable media such as magnetic storage media (e.g., magnetic tapes, hard disks, floppy disks), optical recording media (e.g., CD-ROMs, Digital Versatile Discs (DVDs), etc.), and solid state memory (e.g., random-access memory (RAM), read-only memory (ROM), static random-access memory (SRAM), electrically erasable programmable read-only memory (EEPROM), flash memory, thumb drives, etc.). The computer readable recording media may also be distributed over network coupled computer systems so that the computer readable code is stored and executed in a distributed fashion. This computer readable recording media may be read by the computer, stored in the memory, and executed by the processor.

Also, using the disclosure herein, programmers of ordinary skill in the art to which the invention pertains may easily implement functional programs, codes, and code segments for making and using the invention.

The invention may be described in terms of functional block components and various processing steps. Such functional blocks may be realized by any number of hardware and/or software components configured to perform the specified functions. For example, the invention may employ various integrated circuit components, e.g., memory elements, processing elements, logic elements, look-up tables, and the like, which may carry out a variety of functions under the control of one or more microprocessors or other control devices. Similarly, where the elements of the invention are implemented using software programming or software elements, the invention may be implemented with any programming or scripting language such as C, C++, JAVA®, assembler, or the like, with the various algorithms being implemented with any combination of data structures, objects, processes, routines or other programming elements. Functional aspects may be implemented in algorithms that execute on one or more processors. Furthermore, the invention may employ any number of conventional techniques for electronics configuration, signal processing and/or control, data processing and the like. Finally, the steps of all methods described herein may be performed in any suitable order unless otherwise indicated herein or otherwise clearly contradicted by context.

For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. The words "mechanism", "element", "unit", "structure", "means", and "construction" are used broadly and are not limited to mechanical or physical embodiments, but may include software routines in conjunction with processors, etc.

The particular implementations shown and described herein are illustrative examples of the invention and are not intended to otherwise limit the scope of the invention in any way. For the sake of brevity, conventional electronics, control systems, software development and other functional aspects of the systems (and components of the individual operating components of the systems) may not be described in detail. Furthermore, the connecting lines, or connectors shown in the various figures presented are intended to represent exemplary functional relationships and/or physical or logical couplings between the various elements. It should be noted that many alternative or additional functional relationships, physical connections or logical connections may be present in a practical device. Moreover, no item or component is essential to the practice of the invention unless the element is specifically described as "essential" or "critical".

The use of any and all examples, or exemplary language (e.g., "such as") provided herein, is intended merely to better illuminate the invention and does not pose a limitation on the scope of the invention unless otherwise claimed. Numerous modifications and adaptations will be readily apparent to those of ordinary skill in this art without departing from the spirit and scope of the invention as defined by the following claims. Therefore, the scope of the invention is defined not by the detailed description of the invention but by the following claims, and all differences within the scope will be construed as being included in the invention.

No item or component is essential to the practice of the invention unless the element is specifically described as "essential" or "critical". It will also be recognized that the terms "comprises," "comprising," "includes," "including," "has," and "having," as used herein, are specifically intended to be read as open-ended terms of art. The use of the terms "a" and "an" and "the" and similar referents in the context of describing the invention (especially in the context of the following claims) are to be construed to cover both the singular and the plural, unless the context clearly indicates otherwise. In addition, it should be understood that although the terms "first," "second," etc. may be used herein to describe various elements, these elements should not be limited by these terms, which are only used to distinguish one element from another. Furthermore, recitation of ranges of values herein are merely intended to serve as a shorthand method of referring individually to each separate value falling within the range, unless otherwise indicated herein, and each separate value is incorporated into the specification as if it were individually recited herein.

What is claimed is:

1. A photographing apparatus comprising:
   a sensor being configured to capture an image from incident light thereon; and
   at least one processor being configured to:
   determine an operation mode of the photographing apparatus prior to capturing the image;
   wherein when the photographing apparatus is in a picture upload mode, the processor is configured to:
     determine a communication status of the photographing apparatus, wherein the communication status is determined based on determining i) a communication type and ii) a communication speed from among a plurality of communication speeds corresponding to the determined communication type;
     set a resolution for a first image file for the captured image according to the communication status;
     generate the first image file from the captured image, the first image file having the set resolution; and
     transmit the first image file to an external device; and
   when the photographing apparatus is not in the picture upload mode, the processor is configured to generate a second image file having a pre-set resolution independent of the communication status.

2. The photographing apparatus of claim 1, wherein the at least one processor is further configured to set the resolution higher for a first communication speed than for a second communication speed, wherein the first communication speed is higher than the second communication speed.

3. The photographing apparatus of claim 1, wherein a maximum resolution for the first image file, set by the at least one processor, varies with the communication type.

4. The photographing apparatus of claim 1, wherein the at least one processor is further configured to set the operation mode of the photographing apparatus to the picture upload mode for generation of the first image file to be transmitted to the external device.

5. The photographing apparatus of claim 1, wherein the at least one processor is further configured to store the second image file.

6. A method of controlling a photographing apparatus, the method comprising:
   determining an operation mode of the photographing apparatus prior to capturing an image, wherein when the photographing apparatus is in a picture upload mode, the method comprises:
     capturing the image;
     determining a communication status of the photographing apparatus, wherein the communication status is determined based on determining i) a communication type and ii) a communication speed from among a plurality of communication speeds corresponding to the determined communication type;
     setting a resolution for a first image file for the captured image according to the communication status;
     generating the first image file from the captured image, the first image file having the set resolution; and
     transmitting the first image file to an external device; and
   when the photographing apparatus is not in the picture upload mode, the method comprises generating a second image file having a pre-set resolution independent of the communication status.

7. The method of claim 6, wherein the setting of the resolution comprises setting the resolution higher for a first communication speed than for a second communication speed, wherein the first communication speed is higher than the second communication speed.

8. The method of claim 6, wherein a maximum resolution for the first image file varies with the communication type.

9. The method of claim 6, further comprising, before the capturing of the image, setting the operation mode of the photographing apparatus to the picture upload mode for generation of the first image file to be transmitted to the external device.

10. The method of claim 6, further comprising storing the second image file.

11. A non-transitory computer-readable recording medium having recorded thereon computer program codes to perform a method of controlling a photographing apparatus via a processor,
    wherein the method of controlling the photographing apparatus comprises:
    determining an operation mode of the photographing apparatus prior to capturing an image, wherein when the photographing apparatus is in a picture upload mode, the method comprises:
      capturing the image;
      determining a communication status of the photographing apparatus, wherein the communication status is determined based on determining i) a communication type and ii) a communication speed from among a plurality of communication speeds corresponding to the determined communication type;
      setting a resolution for a first image file for the captured image according to the communication status;
      generating the first image file from the captured image, the first image file having the set resolution; and
      transmitting the first image file to an external device; and
    when the photographing apparatus is not in the picture upload mode, the method comprises generating a second image file having a pre-set resolution independent of the communication status.

12. The non-transitory computer-readable recording medium of claim 11, wherein the setting of the resolution comprises setting the resolution higher for a first communication speed than for a second communication speed, wherein the first communication speed is higher than the second communication speed.

13. The non-transitory computer-readable recording medium of claim 11, wherein a maximum resolution for the first image file varies with the communication type.

14. The non-transitory computer-readable recording medium of claim 11, wherein the method of controlling the photographing apparatus further comprises, before the capturing of the image, setting the operation mode of the photographing apparatus to the picture upload mode for generation of the first image file to be transmitted to the external device.

15. The non-transitory computer-readable recording medium of claim 11, wherein the method of controlling the photographing apparatus further comprises
storing the second image file.

* * * * *